Feb. 19, 1963  A. E. WEINGARD  3,077,896
MULTIPLE SEAT VALVE
Filed Oct. 1, 1959

INVENTOR.
Archie E. Weingard
BY Ralph Hammar
Attorney

United States Patent Office 3,077,896
Patented Feb. 19, 1963

3,077,896
MULTIPLE SEAT VALVE
Archie E. Weingard, 1015 Township Line Road,
Jenkintown, Pa.
Filed Oct. 1, 1959, Ser. No. 843,695
1 Claim. (Cl. 137—329.06)

This invention is a multiple seat ball check valve having concentric radially spaced seats arranged so that at least two of the seats are initially substantially tangents to the ball and at least one additional seat comes into cumulative tangency as the first seats wear.

Figure 1:
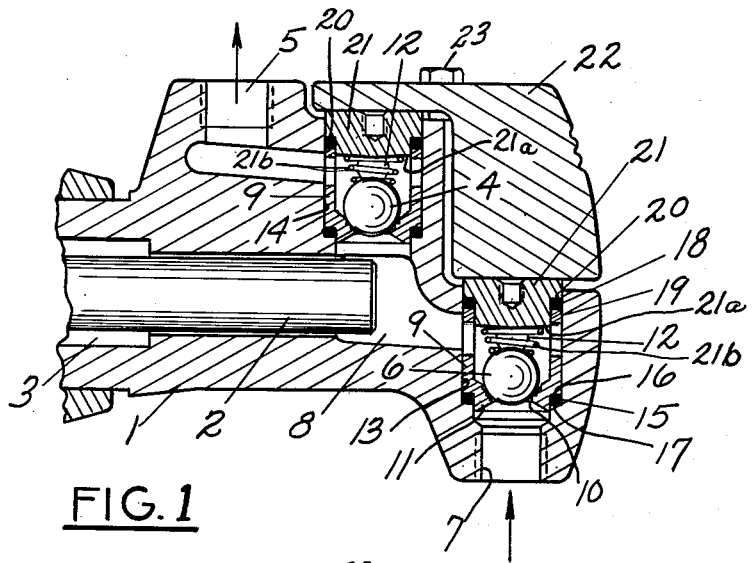
Figure 2:
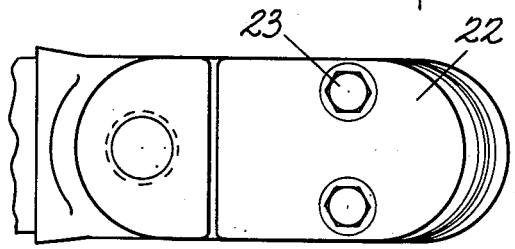
Figure 3:
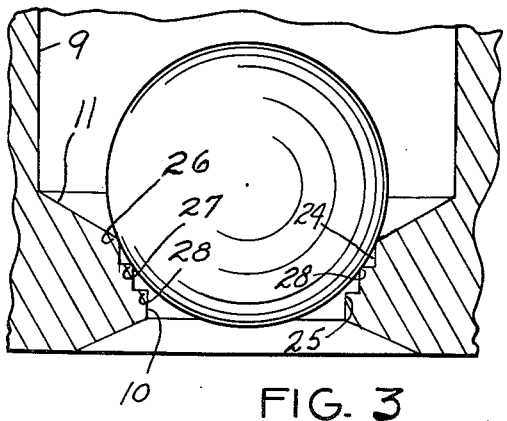
Figure 4:
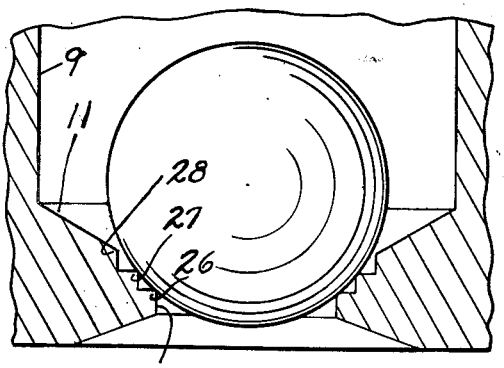

In the drawing, FIG. 1 is a fragmentary section of a pump equipped with two ball check valves, FIG. 2 is a top plan of the part of the pump illustrated in FIG. 1, and FIGS. 3 and 4 are diagrams illustrating the sealing action of the check valves.

The pump has a body 1 and a piston 2 reciprocated through packing 3. On the suction stroke a ball 4 closes the outlet 5 and a ball 6 opens the inlet 7 permitting fluid to be drawn into the pumping chamber 8. On the pressure stroke, the ball 6 closes the inlet 7 while the ball 4 opens the outlet permitting fluid to be forced from the pumping chamber 8. The parts so far described are or may be of common construction.

The ball check valves are vital to the operation of the pump. Back flow past the ball 4 must be positively prevented during the suction stroke and back flow past the ball 6 must be positively prevented during the pressure stroke. One factor which tends to interfere with positive sealing of the balls is the presence of foreign matter in the fluid being pumped. Such foreign matter may accumulate on the valve seats and prevent tight seating of the balls. Another factor interfering with the positive sealing is the tendency of the valve seats to wear out of round. This is inherent in ball check valves where the balls spin when lifted off the seats and almost always strike one side of the seat before seating fully. Both of these difficulties are overcome by the present construction.

The seat members for the inlet and outlet check valves are not my invention but are the subject of application Serial No. 862,511, filed December 29, 1959, and comprise identical cup-shaped members 9 having a center inlet opening 10 in the bottom wall 11 and having a plurality of discharge openings 12 in the side walls. The seat members are removably received in a bore 13 at the inlet or in a bore 14 at the outlet of the pump, as the case may be. The lower ends of the seat members are sealed by a gasket 15 arranged between shoulders 16 and 17 and the upper ends of the seat members are sealed by a gasket 18 arranged between the rim 19 and a shoulder 20 on a cap 21. At the center of each cap 21 is a spring seat 21a for a spring 21b which urges the associated ball 4 or 6 toward its seat. The seat members are held in place by a clamping member 22 secured to the pump body by cap screws 23. This permits easy removal and replacement of the seat members which is an important advantage in pumps for corrosive or abrasive fluids.

The sealing action resulting from my invention is illustrated in enlarged views, FIGS. 3 and 4, from which it can be seen that in each of the seat members 9 there is around the opening 10 a series of steps 24, providing sharp corners or lands 25 for making sealing contact with the ball. The sharp corners tend to cut through soft particles of foreign matter in the fluid, such as lint, thread, rubber, etc., which might interfere with the sealing action. Hard particles of foreign matter have less chance of being caught between the sharp corners and the plunger. The sharp corners or lands 25 are, accordingly, desirable from the point of view of positive sealing.

In order to take advantage of the positive sealing characteristics of sharp cornered seats, and at the same to have sufficient contact area between the seat and ball to take the necessary impact, the seats are arranged to come progressively into cumulative contact with the ball as the seats wear. With this construction the seat which last comes into contact with the plunger presents the sharp or narrow sealing surface desirable for positive sealing action while the other seats which have wider sealing surfaces take the initial impact and guide the ball into place as well as assisting in the sealing.

As initially manufactured, the sharp corners or lands 25 of the steps 24 lie on a surface which diverges from the cooperating surface of the balls. After machining the seats, a master plunger having the shape of the balls 4, 6 is inserted into the seat and struck a sharp blow, thereby planishing the sharp corner 25 which first comes into contact with the master plunger and bringing the second seat 25 into sealing contact with the master plunger. The sealing action between the plunger and the seats is now divided between two seats, both of which are initially tangent to the ball and have the narrow lands desirable for good sealing and self cleaning. Grinding or lapping of the seats is not necessary. The seat which makes initial contact with the ball 4 or 6 need not have any particular location so long as the other seats are arranged to come progressively into contact with the ball. In FIG. 3, the two seats which make initial contact with the ball are adjacent the upper surface of the bottom wall 11 or at the region of maximum diameter. In FIG. 4, the two seats which make initial contact with the ball are adjacent the lower surface of the bottom wall 11 or at the region of minimum diameter. In both cases, it will be noted that wear of the first two seats causes a third seat to come progressively into cumulative tangency with the ball. So long as the seats are related to the surface of the ball so that as the seats wear, other sharp cornered seats are brought successively into cumulative tangency, the advantages will be obtained.

In both FIGS. 3 and 4, the ball has approximately ⅔ of its contact area between it and the seat 26 which first comes into contact with the ball and approximately ⅓ of its contact area with the seat 27 which next comes into contact with the ball. Initially, the entire contact area with the ball is divided between the seats 26 and 27. The third seat 28 is out of contact with the ball and will not come into cumulative contact with the ball to supplement the seats 26 and 27 until the seats 26 and 27 have worn.

The multiple seat construction is of particular advantage in check valves where the ball is free to float. Because the ball is free to float, it spins as it lifts off the seat and is not perfectly centered when it falls back toward the seat and usually strikes first against one side of the first seat it contacts and wears it out of round. If only a single seat were relied upon for sealing action, the out of round wear would interfere with the sealing because a round ball cannot seal on an elliptical or out of round seat. However, with the multiple seat construction, the seat which makes initial contact with the ball acts as a guide tending to center the ball with respect to the remaining seats. By the time the ball contacts the second and succeeding seats, it is centered and out of round wear which would interfere with the sealing action is eliminated on the second and succeeding seats. While in most valves the sealing action deteriorates with wear, in the present valve wear improves the sealing action.

The angle of tangency between the seats and balls is always less than the angle at which the balls would wedge in the seats and interfere with the free release essential for check valves.

What is claimed as new is:

A ball check valve having a way with a central opening surrounded by at least three rigid coaxial radially spaced annular steps providing axially spaced narrow lands of progressive diameters, a spring seat spaced above said opening, a coil spring coaxial with said opening and having one end on said seat and the other end presented toward said opening, a free floating rigid ball free to turn in any direction and engaging said other end of the spring and urged thereby against said lands, at least two lands being initially tangent to the ball and at least one other land coming into cumulative tangency with the ball upon wear of the initially tangent lands, the land which first comes into contact with the ball having greater area of contact with the ball than the next land tending to center the ball wtih respect to the succeeding lands, and the angle of tangency between the lands and the ball being less than the angle at which the ball would wedge in the lands and interfere with the free release essential for check valves.

References Cited in the file of this patent

UNITED STATES PATENTS

| | | |
|---|---|---|
| 489,324 | Patterson | Jan. 3, 1893 |
| 558,744 | Schroppel | Apr. 21, 1896 |
| 1,144,499 | Owens | June 29, 1915 |
| 1,202,044 | Fisher | Oct. 24, 1916 |
| 1,979,305 | Armstrong | Nov. 6, 1934 |
| 2,770,443 | Rand | Nov. 13, 1956 |
| 2,954,796 | Marshall | Oct. 4, 1960 |

FOREIGN PATENTS

| | | |
|---|---|---|
| 12,619 | Great Britain | of 1895 |